US008549101B2

(12) United States Patent
Mehta et al.

(10) Patent No.: US 8,549,101 B2
(45) Date of Patent: Oct. 1, 2013

(54) PORTABLE EMBEDDED LOCAL SERVER FOR WRITE-THROUGH CACHE

(75) Inventors: Nikunj R. Mehta, Cupertino, CA (US); Garret Swart, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 156 days.

(21) Appl. No.: 12/618,654

(22) Filed: Nov. 13, 2009

(65) Prior Publication Data

US 2010/0319054 A1 Dec. 16, 2010

Related U.S. Application Data

(63) Continuation-in-part of application No. 12/485,801, filed on Jun. 16, 2009.

(51) Int. Cl.
*G06F 15/16* (2006.01)
*G06F 17/30* (2006.01)
*H04L 9/32* (2006.01)

(52) U.S. Cl.
USPC ............ 709/217; 709/203; 709/224; 709/229

(58) Field of Classification Search
None
See application file for complete search history.

(56) References Cited

U.S. PATENT DOCUMENTS

| | | | | |
|---|---|---|---|---|
| 6,453,320 B1 * | 9/2002 | Kukura et al. | ................ | 707/791 |
| 6,473,758 B1 * | 10/2002 | Schwartz et al. | ................ | 1/1 |
| 6,766,335 B2 * | 7/2004 | Kukura et al. | ................ | 717/108 |
| 7,089,278 B1 * | 8/2006 | Churchill et al. | ............. | 709/203 |
| 7,472,411 B2 * | 12/2008 | Wing et al. | ................ | 726/5 |
| 7,590,844 B1 * | 9/2009 | Sherman et al. | ............. | 713/171 |
| 7,747,856 B2 * | 6/2010 | Favazza et al. | ............... | 713/168 |
| 7,748,047 B2 * | 6/2010 | O'Neill | ............. | 726/29 |
| 7,853,648 B1 * | 12/2010 | Chalfin et al. | ................ | 709/203 |
| 7,890,570 B2 * | 2/2011 | Mazzaferri | ................... | 709/202 |
| 8,132,242 B1 * | 3/2012 | Wu | ................ | 726/8 |
| 8,139,483 B2 * | 3/2012 | Bauer et al. | ................ | 370/230.1 |
| 2002/0059531 A1 | 5/2002 | Lai On | | |
| 2002/0069282 A1 * | 6/2002 | Reisman | ................ | 709/227 |
| 2002/0099850 A1 * | 7/2002 | Farber et al. | ................. | 709/245 |
| 2002/0099952 A1 * | 7/2002 | Lambert et al. | ................ | 713/200 |
| 2003/0105735 A1 * | 6/2003 | Kukura et al. | ................... | 707/1 |
| 2003/0149793 A1 * | 8/2003 | Bannoura et al. | ............. | 709/247 |

(Continued)

FOREIGN PATENT DOCUMENTS

| | | | |
|---|---|---|---|
| EP | 1953668 A2 * | 8/2008 | |
| EP | 1953669 A2 * | 8/2008 | |
| JP | 2008187718 A * | 8/2008 | |
| WO | WO 2007/036024 | 4/2007 | |

OTHER PUBLICATIONS

"Sessions at Google I/O" Developer Conference May 27-28, 2009 downloaded from the Internet Apr. 28, 2009 < http://code.google.com/events/io/sessions.html > (3 pages).

(Continued)

*Primary Examiner* — Wing F Chan
*Assistant Examiner* — Kostas Katsikis
(74) *Attorney, Agent, or Firm* — Hickman Palermo Truong Becker Bingham Wong LLP (57) ABSTRACT

A method of facilitating, via an embedded local server, dynamic responses to requests originating from an application and directed to a server is disclosed. An intermediary intercepts requests responds to the requests with locally stored data. The intermediary may also forward requests to an embedded local server for processing based on local data.

38 Claims, 3 Drawing Sheets

(56) References Cited

U.S. PATENT DOCUMENTS

| | | | |
|---|---|---|---|
| 2004/0122877 A1* | 6/2004 | Nakayama | 708/200 |
| 2005/0144451 A1 | 6/2005 | Voice et al. | |
| 2005/0174937 A1* | 8/2005 | Scoggins et al. | 370/230 |
| 2006/0015933 A1* | 1/2006 | Ballinger et al. | 726/10 |
| 2006/0143703 A1* | 6/2006 | Hopen et al. | 726/15 |
| 2006/0167975 A1* | 7/2006 | Chan et al. | 709/203 |
| 2008/0201331 A1 | 8/2008 | Eriksen et al. | |
| 2010/0002880 A1* | 1/2010 | Yoon et al. | 380/255 |
| 2010/0083364 A1* | 4/2010 | Fernandez Gutierrez | 726/13 |
| 2010/0318640 A1* | 12/2010 | Mehta et al. | 709/223 |

OTHER PUBLICATIONS

"NSURLProtocol Class Reference" downloaded from the Internet Jun. 11, 2009 < http://developer.apple.com/documentation/Cocoa/Reference/Foundation/Classes/NSURLP . . . > (8 pages).

<< Asynchronous Pluggable Protocols >> 2009 Microsoft Corporation downloaded from the Internet Jun. 11, 2009-11-12< http://msdn.microsoft.com/en-us/library/aa767743(VS.85,printer).aspx (4 pages).

S. Keshav., "An Engineering Approach to Computer Networking", copyright 1997, 17 pages.

* cited by examiner

PORTABLE EMBEDDED LOCAL SERVER FOR WRITE-THROUGH CACHE

CROSS-REFERENCE TO RELATED APPLICATIONS

Benefit Claim

This application claims benefit as a Continuation-in-part of application Ser. No. 12/485,801, filed Jun. 16, 2009, the entire contents of which is hereby incorporated by reference as if fully set forth herein, under 35 U.S.C. §120. The applicants hereby rescind any disclaimer of claim scope in the parent application or the prosecution history thereof and advise the USPTO that the claims in this application may be broader than any claim in the parent application.

FIELD OF THE INVENTION

The present invention relates generally to management and delivery of data and, more specifically, to techniques for managing off-line data in networked applications.

BACKGROUND

Many mobile computing applications rely on data that resides on a machine that is remote to the device on which the application runs. Although an application may be robust, lack of network connectivity or access to a required server may cause the application to behave unpredictably or provide incorrect information. For example, a calendar application running on a smart-phone may display an error when it is unable to access the server on which the calendar information resides.

Lack of network availability or server connectivity may occur because of a variety of factors. For example, servers are often not configured for high-availability. Further, networks may not reach many locations, and are therefore not ubiquitous. This lack of connectivity disappoints users that rely on instantaneous information. Mobile networks are particularly problematic in this way, due to limited coverage in areas that may seem random to the ordinary user.

To ensure predictable behavior in mobile computing applications, many applications allow for off-line data storage. There are several methods of providing off-line storage: 1) Data is stored locally, and backed up on the server; 2) A local cache and a server store are used, each relying on distinct data models and access methods; and 3) A local cache and a server store are used, each relying on the same data model but using distinct access methods.

Where data is stored locally, and backed up on the server, as in the first method, a database, application server, and application client may be installed on a client device. Data in the database and any other application data need to be synchronized with the remote system. The synchronization techniques used are application specific.

In the second method, the local database is often better suited to local processing, and stores a transformation of the online data. Due to the application-specific transformation of data, applications sharing data must conform to the transformation. Further, in this model, applications employ a data switch between on-line and off-line operation, explicitly accessing the local database when off-line. This method in effect creates two separate applications that are accessible via the same user interface.

In the third method, the data model remains the same among the application and the server, but the access methods differ. Applications use HTTP requests and responses when working on-line, and store the responses in a local database. This storage is used for off-line operation. Applications must still employ a data switch, but data is not transformed. Using the locally stored data, however, requires that a completely different access method be developed as part of the application. Furthermore, the application must be aware of the state of the network, and switch between access methods based on network availability. The offline access method requirement results in additional development time, and uses additional processing not required for on-line operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

| | | |
|---|---|---|
| 1.0 | General Overview | |
| 2.0 | Structural and Functional Overview | |
| | 2.1 | Structural Overview |
| | 2.2 | Functional Overview |
| 3.0 | Managing Data | |
| | 3.1 | Interposition |
| | 3.2 | Embedded Server |
| | 3.3 | Interception Key Registry |
| | 3.4 | Embedded Server Registry |
| | 3.5 | Intermediary Store |
| | 3.6 | Embedded Server Store |
| | 3.7 | Policy Decisions |
| | 3.8 | Bi-Directional Synchronization |
| | 3.9 | Authorization |
| 4.0 | Example Embodiments | |
| | 4.1 | Example Flow |
| | 4.2 | Spreadsheet-to-PDF Example |
| | 4.3 | Photo Sharing Example |
| | 4.4 | Contact List Example |
| | 4.5 | General Example |
| 5.0 | Implementation Mechanisms - Hardware Overview | |

1.0 GENERAL OVERVIEW

In an embodiment, an intermediary intercepts a request form an application running on a computing device. The request is directed to a server, and includes a resource identifier, such as a Uniform Resource Indicator (URI) or Uniform Resource Locator (URL), and one or more protocol methods. The methods represent actions that may be performed on a resource in accordance to a protocol. A key is retrieved from an interception key registry having multiple keys. The key holds a URI and one or more references to protocol methods. The URI and method from the request is matched with the key. Based on a key, the request is relayed to an embedded server. A response is received from the embedded server.

In another embodiment, an embedded server is determined based on the key. The key is matched to an embedded server address that is stored in an embedded server registry having multiple embedded server addresses.

In another embodiment, a protocol method is implied by a NULL value reference.

In another embodiment, data is retrieved from a local data store based on the key. A response is sent based on the data retrieved from the local store.

2.0 STRUCTURAL AND FUNCTIONAL OVERVIEW

2.1 Structural Overview

Figure 1:
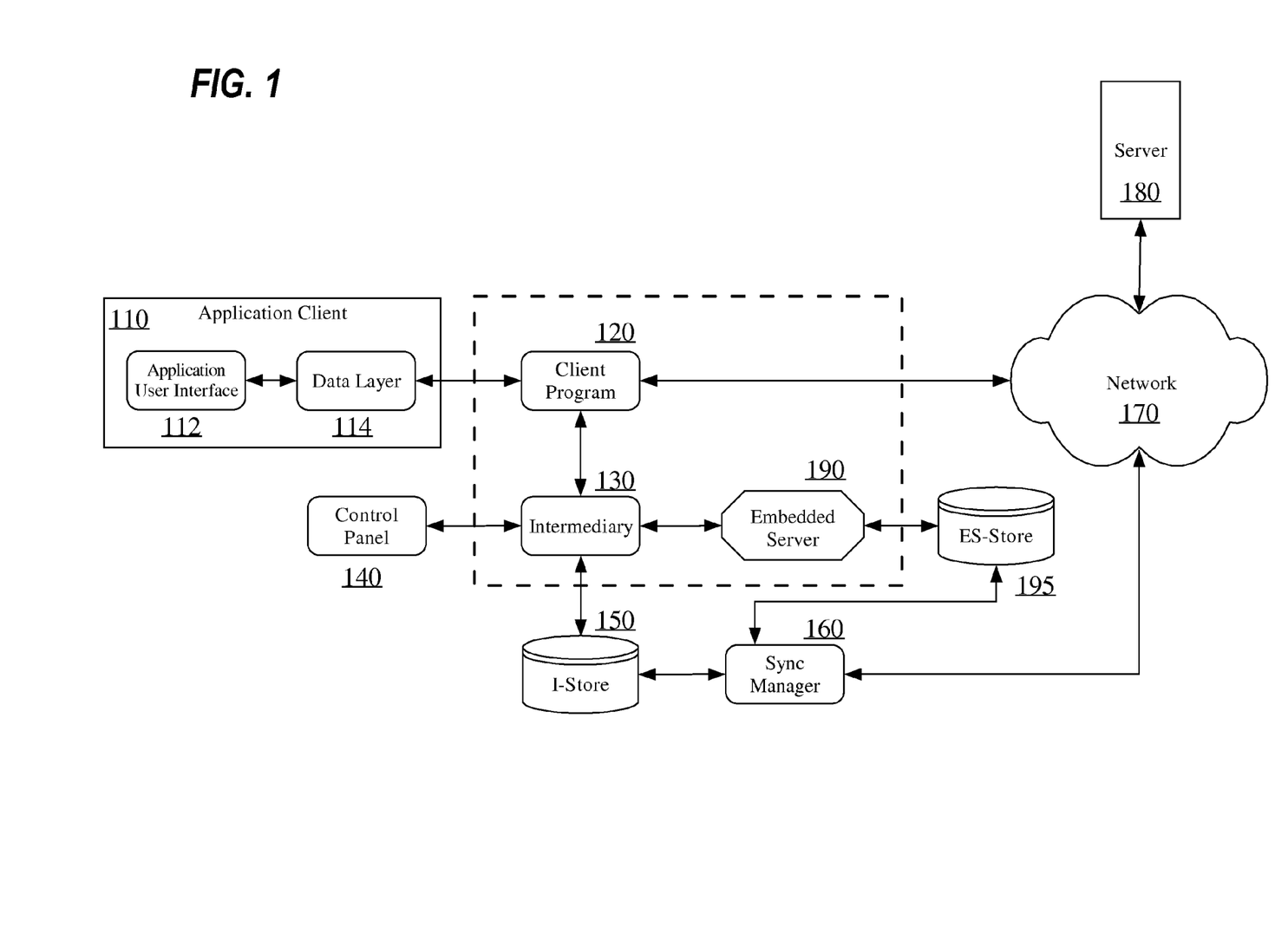
FIG. 1 is a block diagram illustrating an architecture on which an embodiment may be implemented.

FIG. 1 is a block diagram that illustrates an architecture on which an embodiment may be implemented. Application client 110 is made up of an application user interface 112 and a data layer 114. The data layer 114 is coupled to client program 120. Client program 120 may be a web browser or any other type of agent. Client program 120 and server 180 are each coupled to network 170. Client program 120 is also connected to intermediary 130.

Intermediary 130 is coupled to control panel 140, intermediary storage (I-Store) 150, and embedded server 190. Intermediary 130 may be a browser plug-in, and may be embedded in the same process as client program 120.

Embedded server 190 is coupled to embedded server store (ES-Store) 195. Embedded server may be a JavaScript virtual machine (VM) or any other component capable of local server functionality. In an embodiment, ES-Store 195 is an embedded database.

Control panel 140 may be used to configure intermediary 130, embedded server 190, or other elements in the system for which the control panel has been given authorization to perform configuration functions. Synchronization manager (Sync manager) 160 is coupled to Network 170. Sync manager 160 manages the synchronization of data between I-Store 150 and server 180. Sync manager 160 manages the synchronization of data between ES-Store 195 and server 180. Sync manager 160 may be a browser plug-in and may be embedded into the same process as client program 120.

Although FIG. 1 provides a specific architecture, this architecture is flexible, and represents only one embodiment. Certain elements of FIG. 1 may be combined, connected in a different way, or even separated further. For example, intermediary and sync manager 160 may be combined. Further, intermediary 130 may be combined with client program 120. Other elements, such as Network 170 may be discarded altogether in favor of a private network connecting client program 120 directly to server 180. ES-Store 195 and I-Store 150 may be combined in an embodiment. Also, more than one embedded server 190 may exist on the same computing device. Finally, server 180 may be a local server or a server running on the same computing device as client program 120.

2.2 Functional Overview

Application client 110 is an application that may request data from a server, such as a remote server. For example, application client 110 may represent a to-do list application, calendar application, or expense report application for a mobile device such as a smart-phone, personal digital assistant, or laptop. In an embodiment, application client 110 may run within a browser. Application client 110 may also run on a computing device that is not a mobile device.

Server 180 may be a computing device running server software or other proprietary software capable of honoring requests from an application client. Server 180 is capable of storing data either locally or remotely. For example, server 180 may be coupled to a database management system (DBMS) such as a DBMS offered by Oracle Corporation. Server 180 may use a DBMS as a repository for application data such as the data required by application client 110.

Application client 110 interacts with server 180 through a user agent such as client program 120. Client program 120 may be a web browser capable of communicating with server 180 using standard protocols such as Hypertext Transfer Protocol (HTTP).

Intermediary 130 is an interposition agent capable of intercepting and responding to communications between an application such as application client 110 and a server such as server 180. Furthermore, intermediary 130 may interact with multiple applications and servers. Intermediary 130 may be configured, via control panel 140, to intercept and manage only communications that are registered in a key registry. Alternatively, intermediary 130 may be configured to intercept and manage data based on the application or protocol used to send the request, as described in application Ser. No. 12/485,801. For example, a mobile device may make requests to five separate URIs, but intermediary 130 may be configured using a key registry to intercept communications associated with only two of the URIs, and not the other three.

Intermediary 130 may use I-Store 150 to store intercepted requests and data from server 180. I-store 150 may also contain a key registry (not shown), an embedded server registry (not shown), and any other data useful to intermediary 130 such as synchronization data. Sync manager 160 may be configured to periodically synchronize data residing in I-Store 150 and ES-Store 195 with data managed by server 180. Alternatively, sync manager 160 may synchronize data at hard-coded intervals, upon the detection of particular events, or upon manual intervention.

Embedded server 190 may run in the same process as client program 120 and intermediary 130. Embedded server 190 may receive requests from intermediary 130 and process the requests. Embedded server 190 may process requests using data stored in ES-Store 195 and data stored in I-Store 150. ES-Store 195 functions as an embedded database, and may run in the same process as embedded server 190, client program 120, and intermediary 130. ES-Store 195 stores synchronization data and state information that indicates the state of data stored in I-Store 150. ES-Store 195 may store any data that is useful for dynamic processing performed by embedded server 190.

3.0 MANAGING DATA

3.1 Interposition

An application client 110 may send a request, using a client program 120 such as a web browser, to a server 180. A request may be in any format.

The application client 110 may reside on any computing device such as a smart-phone, personal digital assistant (PDA), laptop computer, personal computer, kiosk, household appliance, or vending machine. If the mobile computing device experiences intermittent connectivity, the application client 110 may exhibit undesirable behavior. For example, the application client 110 may display only partial data, outdated data, no data at all, or even an error message.

An intermediary 130, acting as an interposition agent, may intercept and respond to requests from the application client 110 to the server 180. By interposing between the application client 110 and the server 180, the intermediary 130 can take control of the communications in a way that may optionally be transparent to the application client 110.

Intermediary 130 may operate as a plug-in to the client program 120. In one embodiment, intermediary 130 may be automatically downloaded from a network upon the detection of an event or request associated with intermediary 130. Optionally, intermediary 130 may operate as a software module, a library or as a layer of software. In one embodiment, intermediary 130 may be embedded into the application client 110 or another program, and may run in the same process as the program in which intermediary 130 is embedded. In another embodiment, intermediary 130 may be executed upon the detection of a triggering event. For example, a request may be made by a program, the request being directed to a URI that has been registered for local serving. Upon generating the request, the program may cause intermediary 130 to execute.

Intermediary 130 may be configured to intercept, relay, and respond to requests that are used to access and manipulate data. For example, intermediary 130 may be configured to intercept requests having a particular URI prefix as indicated in a key registry.

Control panel 140 may be used to configure intermediary 130 and embedded server 190. For example, intermediary 130 may be configured to intercept requests and replies for a variety of requests residing on the computing system. Configuration may also take place automatically, through installation routines performed during the installation of an application or embedded server 190 on the computing system.

Control panel 140 may also be used to monitor synchronization status. For example, if a synchronization operation results in an error, control panel 140 may report these errors. Control panel 140 may take the form of a web page or other application program, and may reside locally or at a server.

The intermediary 130 may be configured to respond only to requests that occur when network connectivity is unavailable. Alternatively, the intermediary may be configured to respond to particular requests by applications for which the intermediary has been configured, or all requests.

Intermediary 130, sync manager 160, embedded server 190, or any other associated component may be configured to perform actions described herein based on built-in or configurable policies. Policies may be related to time, power consumption, communication privacy, network usage cost, network availability, conflicts caused by server contention, or user expressed preferences. Other configurable policies may also be implemented. For example, a policy may be based on the time of day, or a specified time interval, or schedule. Other policies may be device related, such as those related to power consumption and processing power.

The intermediary 130 may intercept a request, formulate a response, and respond to the application client 110 with the expected data. Intermediary 130 may also relay requests to embedded server 190 for processing. In addition, intermediary 130 may relay requests to the server specified in the request, and then instruct embedded server 190 to review a response provided by the specified server. The response from the intermediary 130 to the application client 110 may include any number of indicators. For example, the response may include data freshness information, alerting the application to the age of the data provided. Another indicator may disclose to the application program 110 that the response is from an intermediary 130 or embedded server 190, and not from server 180.

3.2 Embedded Server

Embedded server 190 may be logically divided based on two main functionality families: the "interception" functions and the "review" functions. The interception functions determine how to respond to a request, based on the information stored locally. The review functions analyze responses received from a server 180 to determine how to better respond to future requests such as offline requests.

In an embodiment illustrating the interception functionality of embedded server 190, embedded server 190 processes requests received from intermediary 130, formulates a response, and provides the response to intermediary 130. For example, intermediary 130 may receive a request from application client 110. Intermediary 130 may determine, based in part on the URI associated with the request, that the request should be processed locally by embedded server 190. Intermediary 130 relays the request to embedded server 190 for processing. Embedded server 190 then responds to intermediary 130 with the results generated from processing the request, and intermediary 130 relays the response to application client 110.

Embedded server 190 provides functionality that mimics functionality of server 180. In an embodiment, embedded server 190 uses local data stored in I-Store 150 and ES-Store 195 to process requests. This allows the user of an application client 110 to have consistent access to functionality normally reserved for situations where network connectivity is available. This is so, even if network connectivity is unavailable or if a competing policy concern, such as low battery power, results in limited network connectivity.

As part of the review functionality of embedded server 190, embedded server 190 may detect, based on a response from server 180, that additional local data should be stored in order to support future requests in offline mode. Embedded server 190 may tell intermediary 130 to request data from server 180 in order to build a library capable of supporting a desired level of functionality for a particular URI. The amount of data gathered for a particular URI prefix may be configured in control panel 140, or may be dynamically determined by embedded server 190. For example, intermediary may be configured to store no more than one gigabyte, and no less than five megabytes of data for a particular URI.

Embedded server 190 may make any configuration change based on the analysis of a response from server 180. For example, embedded server may add or remove interception keys from the interception key registry, add or remove authorization keys from the authorization key registry, alter any data in a local data store such as intermediary store 150 or embedded server store 195, or change synchronization and embedded server policies.

The term "embedded" is used to indicate that the embedded server 190 is a part of the process in which the request was generated. Embedded server 190, intermediary 130, and client program 120, such as a browser, may all run in the same process. A process comprises code and data that may be executed and/or processed by a processor. In an embodiment, embedded server 190 is a JavaScript virtual machine that is running within the browser process. The browser may run the embedded server 190 when appropriate. For example, the browser may run one or more embedded servers 190 when the browser is launched.

A client program 120 such as a browser may be able to launch JavaScript virtual machines as embedded servers 190 without associating the embedded servers 190 with a browser window. Alternatively, each embedded server 190 may operate as a JavaScript virtual machine associated with a tab. If the tab is closed, the embedded server 190 may be de-registered as an available embedded server 190. Embedded servers 190 may be launched automatically, launched based on preferences, included in browser, or launched based on user action.

3.3 Interception Key Registry

An interception key registry is used to store interception keys that each indicate, alone or in combination with other keys, which requests should be intercepted, based on the URIs and methods expressed in the requests. Also, the interception key registry indicates, or at least implies through the use of logic, what actions are to be taken with the requests. Subject to policy intervention, the interception key registry dictates the actions of the intermediary 130 with respect to each individual request.

The interception key registry, in one embodiment, resides in I-Store 150. In another embodiment, the interception key registry may be part of a stand-alone data store that is accessible by intermediary 130.

In an embodiment, the interception key registry includes "interception keys." Each interception key is made up of at least one URI and one or more protocol method identifier that identifies a method. The method identifier may consist of the actual method name, such as "POST," or may consist of any identifier that causes the intermediary to be aware of a particular method and its role in the current process. Although other protocols may be used, Hypertext Transfer Protocol (HTTP) methods and the actions associated with each method are listed below to assist in providing a clear example:

| HTTP Method | Action | Description |
| --- | --- | --- |
| POST | CREATE | Create a new resource |
| GET | RETREIVE | Retrieve a representation of a resource |
| PUT | UPDATE | Update a resource |
| DELETE | DELETE | Delete a resource |

Intermediary 130 may be programmed with logic configured to ignore insignificant portions of a URI, or conform to a default URI prefix. For example, it may be assumed that HTTP is the protocol being used, so that the portion of the URI prefix defining the protocol may be omitted from a interception key. In another embodiment, intermediary 130 may be configured instead to assume that Secure Hypertext Transfer Protocol (HTTPS) is the default. Actions may be implied by the presence of an interception key and the lack of a method. In such a case, a method may even be implied. For example, the lack of a method identifier in an interception key results in a null value for that interception key, which may imply that a particular action should be performed for a pre-determined method such as the "GET" method if a null value is found to be the method identifier. Therefore, the following listings may be considered interception keys:

| | |
| --- | --- |
| http://www.flushtest.com/ | "" |
| https://flushtest.com/booksearch.php? | "POST" |
| flushtest.com/booksearch.php? | "POST", "GET" |

The interception keys may be stored in any format, so long as a URI and a method may be determined from the interception key. For example, the first interception key listed above has a null value for the method identifier. However, as long as the intermediary is aware that a null value means that a particular action should be taken on a request with a predefined method, the null value is an adequate method identifier.

For example, in an embodiment, if an interception key resides in the interception key registry, and a method identifier exists in that interception key, and that method identifier is a non-null value, then the intermediary 130 will know to relay a request to the embedded server 190 if that request uses the method in the interception key and is bound for the URI listed in the interception key. It may also be the case that if the method is a null value, as in the first example of an interception key above, then the intermediary 130 will know to static serve, using data in I-Store 150, all GET requests bound for the URI listed in the interception key.

The interception key registry may be populated with interception keys through various means. Users may configure an application using control panel 140, which in turn adds appropriate interception keys to the interception key registry. Keys may be added to the interception key registry during the installation of a particular embedded server 190, as each embedded server 190 may be associated with a set of interception keys. Finally, an embedded server 190 may cause new keys to be registered with the interception key registry as the embedded server 190 learns of new data that it determines should be stored locally in the I-Store 150.

In the embodiment discussed above, only one interception key registry exists, and the intermediary relies on implication to determine the action to perform based on the interception key. In another embodiment, multiple interception key registries may exist. For example, a key registry for static serving may be populated with keys that represent URIs meant to be statically served by the intermediary 130 using data from the I-Store 150. A second key registry may be populated with keys that represent URIs meant to be dynamically served by an embedded server 190.

3.4 Embedded Server Registry

The primary function of the embedded server registry is to inform intermediary 130 which embedded server 190 to direct requests to for a given interception key. The embedded server registry stores its memory location, process address, or other executable identifying information in the embedded server registry, and associates the address with an interception key. This association can be via a matching URI, key identifier, domain portion of the URI or a URI prefix, or any other form of association with an interception key. Importantly, the intermediary 130 may determine that an interception key is meant to be processed by an embedded server 190 by looking at the interception key registry, and then may determine the embedded server 190 that the request should be forwarded to by matching the key to an embedded server address in the embedded server registry.

In one embodiment, embedded server addresses do not live across restarts. Once the embedded server 190 starts, it will register itself in the embedded server registry and indicate which keys it wants to serve.

3.5 Intermediary Store

The I-Store 150 stores local static representations of data that originated from another server 180. This data may be stored as a bitstream in order to emulate the response provided by the server 180. The I-Store may also contain the interception key registry and the embedded server registry.

I-Store 150 may be in the form of volatile or non-volatile memory, and may be accessible by intermediary 130. Storage may be compressed, encrypted, or otherwise modified to meet design, architecture, security, or performance goals. Alternatively, all or a portion of I-Store 150 may reside at a remote location that is different from server 180. However, local storage of data allows data to be available to applications even when a network connection is unavailable.

For example, I-Store 150 may contain a copy of a particular Atom feed that originated from server 180. Application client 110 may request the particular Atom feed using the URL for the feed. Intermediary 130 may intercept this request, and Intermediary 130 may respond to the request with the copy of the particular Atom feed from I-Store 150. Thus, the application client 110 may make a request from server 180, but will receive the feed that is stored locally in I-Store 150. Although this may be particularly useful when a network connection is unavailable, this condition is not required, and other benefits may be realized even when network connectivity is available.

3.6 Embedded Server Store

The ES-Store 195, in an embodiment, is used primarily for storing data state information about data that the embedded server 190 is interested in. ES-Store functions as a local database, and may execute in the same process as embedded server 190, intermediary 130, and client program 120.

Although the ES-Store 195 may be used to store original application data, as will be discussed in connection with an example in section 4.0, ES-Store 195 also stores information about the contents and state of the data stored in I-Store 150. ES-Store 195 also stores synchronization data generated by the embedded server 190 in response to changes made to local representations of data stored in the I-Store 150.

For example, intermediary 130 may intercept a request from application client 110, and determine that the request is to be served by embedded server 190. The request may be a request to change data, and no network connectivity is available. The request may be relayed to the embedded server 190 for processing. As part of the processing performed by the embedded server 190, data in I-Store 150 is changed, and a response is generated based on the changed data in the I-Store 150. In response, the embedded server 190 may update the interception key registry to indicate that a request based on the changed data may be static-served by intermediary 130. Embedded server 190 will also create synchronization data in the ES-Store 195, indicating the requests to be made to server 180 by synchronization manager 160 once network connectivity is detected. This ensures that the data in the I-Store 150 is consistent with the data in the server 180.

3.7 Policy Decisions

Although the interception key registry indicates the actions to be taken for each request based on the interception key associated with that request, the actions specified or implied by the interception key registry or other configuration information may be overridden by policy.

In the context of mobile computing, as an example, the use of network resources, even when network resources such as server 180 are available, may be undesirable. For instance, battery technology is not keeping up with other advances in mobile computing. While users of mobile computing devices increase the amount of time spent using the devices, and the devices are endowed with increasing power, functionality, and appeal, the battery technology powering these devices is not keeping up. Thus, the user of a mobile computing device may find himself needing access to dynamic data, but with very little battery power.

But the intermediary 130 may be configured to detect when available battery power reaches a certain threshold, and move all the dynamic services it can under an embedded serving policy umbrella, causing all data that can be delivered using local resources to be delivered using only local resources. Taking advantage of the embedded server 190 and the locally stored data will result in conservation of battery power by abstaining from network usage, allowing the phone or other important functionality to remain in service for a while longer.

Other policy considerations may include time, power consumption, communication privacy, network usage cost, network availability, conflicts caused by server contention, or user expressed preferences.

Synchronization manager 160 may also be configured to recognize policy criteria. In an example embodiment, synchronization is configured to occur at a frequency that is determined based on the remaining battery life of the mobile device. The frequency of the synchronization operation may decrease as the battery life decreases in order to conserve power. This would reflect a policy that favors prolonged battery life over synchronized data. In another embodiment, a policy may require that data be synchronized more frequently as the battery reaches exhaustion in order to ensure that all data is as accurate as possible once the device is forced offline. Any combination of policy considerations may be utilized in creating a synchronization policy.

Based on the above considerations or any other considerations that may benefit from providing local server support, the intermediary may be directed to relay, intercept, or serve a request. A request relay is a form of write-through caching. Intermediary 130 sends the request to the server 180 and then informs the embedded server 190 that a particular response was obtained in response to a particular request. Intercepting a request is a form of write-back caching. Intermediary 130 intercepts the request, relays the request to embedded server 190, which generates a response. The response is sent to the application, and that response is later synchronized with server 180. To serve the request, the intermediary 130 provides, to the application, the locally stored representation of the data from the I-Store 150. This is usually performed with GET and HEAD requests.

3.8 Bi-Directional Synchronization

Bi-directional synchronization support may be enabled. Sync manager 160 performs synchronization operations. Since data from the server may be stored locally and data meant to be published to the server may be stored locally, it is prudent to ensure continuity between the I-Store 150 and the data managed by the server 180 for the application.

Local data in I-Store 150 may be updated every time a request is honored by server 180. For example, in the presence of network connectivity, application client 110 may make a request to server 180 for information. Since network connectivity is available, the intermediary, in an embodiment, may not manage the request but may transparently intercept the reply from server 180. After intercepting the reply, a copy of the bitstream may be stored in I-Store 150. Embedded server 190 will then be alerted to the change, and embedded server 190 will update the ES-Store 195 to reflect the change in state of the data in the I-Store 150.

Alternatively, sync manager 160 may be configured via control panel 140 to periodically synchronize data for particular embedded servers. In such an embodiment, data in I-Store 150 and ES-Store 195 may be synchronized with data managed by server 180, even if no request is made by application client 110. This ensures that in a case where network connectivity is unavailable, the application will have access to the most up-to-date data possible.

Any number of requests may be stored locally at a given time. For example, several applications which are unrelated to each other may make requests which are intercepted and stored by the intermediary 130. Using control panel 140, sync manager may be configured to automatically synchronize data related to all applications when network connectivity is established. Alternatively, Sync manager 160 may be configured to synchronize data according to preferences unique to each particular application 110 or embedded server 190. For example, a first embedded server 190 may be configured to synchronize only upon user direction, while a second may be configured to synchronize every 10 minutes. Synchronization manager 160 will distinguish between the pending update in ES-Store 195 and synchronize only data associated with the appropriate embedded server 190 at the proper time interval. A third embedded server may be configured to synchronize every time connectivity is established and a request is pending.

Synchronization requests may be condensed when possible. For example, the embedded server 190 may change a phone number in a feed based on a first request to do so. Subsequently, a second request to change the phone number may be made. When synchronization take place with server 180, a third request is dynamically generated based on the first and second requests, to change the phone number on the server to reflect the final outcome of the first and second requests. Over many clients, such condensation of requests may dramatically reduce server load.

3.9 Authorization

In an embodiment, embedded server 190 may access an authorization registry that includes entries known as "authorization keys." Authorization keys represent authorization conditions. Authorization conditions may assist the intermediary 190 in determining whether or not a user is authorized to access a particular data item, such as content stored in I-Store 150 or ES-Store 195.

Authorization keys may be associated with interception keys. This association may be defined in the interception key registry as an additional part of the interception key. For example, the interception key may include a reference to an entry in the authorization key registry. Other means of association may be used.

For example, the intermediary 190 may store, as an authorization key, the active state of the authorization condition associated with a requesting application in the authorization registry. In such an embodiment, an entry in the interception key registry is also made, creating an interception key. The newly added interception key is automatically associated with the authorization key. For example, the interception key may include a reference to the authorization key. Using the interception key and the authorization condition in the associated authorization key, a request may be made to server 180. For example, the request may include the URI of the interception key, a protocol method, the authorization condition, and any other relevant arguments. Upon receiving a response from server 180, intermediary 190 may store the response. For example, a bitstream representation of the response may be stored.

Subsequently, a request including the authorization state of the application may be intercepted by intermediary 190. The intermediary 190 determines whether there is a match between the new request and the interception key based on the URI and the protocol method. The authorization state is compared with the authorization key associated with the interception key. If the condition specified by the authorization key is not satisfied, the intermediary produces an authorization error response. If the condition is satisfied, then the interception function is given access to the previously stored data associated with the previous request.

The condition specified by the authorization may not remain satisfied indefinitely, however. For example, an authentication session may time out after a while, causing authentication failure to occur where the authorization condition had previously been satisfied. In this case, the intermediary 190 may remove any data associated with the previous authorization. For example, any data in the ES-Store 195 associated with the authorization may be deleted. Additionally, the intermediary may delete records in the interception key and the authorization key that were associated with the condition that is no longer satisfied.

4.0 EXAMPLE EMBODIMENTS

4.1 Example Flow

Figure 2:
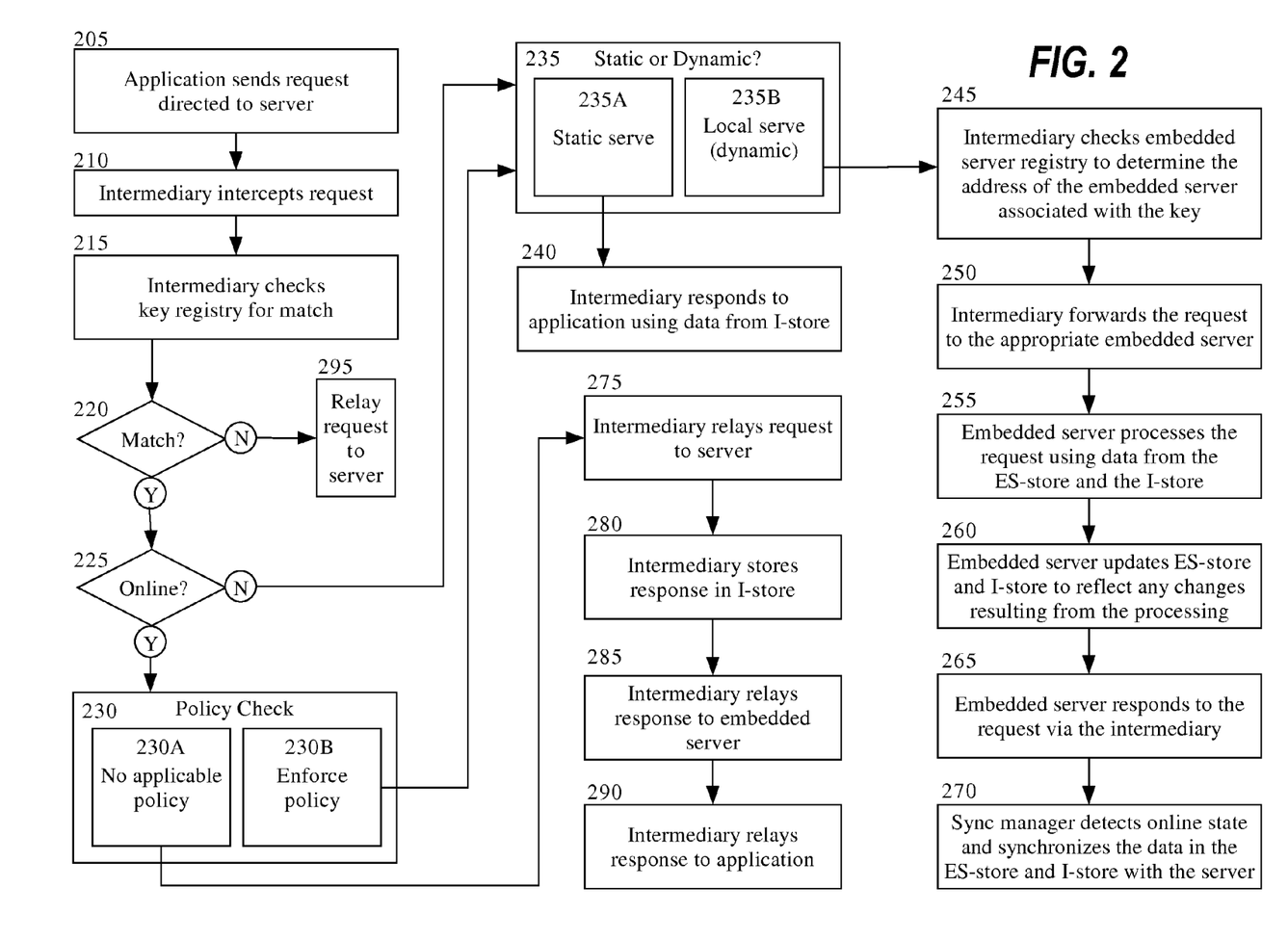
FIG. 2 is a flow diagram illustrating a procedure for managing requests in an embodiment.

FIG. 2 is a flow diagram representing an exemplary embodiment. At step 205, an application client 110 sends a request directed to server 180. At step 210, intermediary 130 intercepts the request. At step 215, the intermediary checks the interception key registry to see if the request matches an interception key in the interception key registry. If there is no match, the intermediary relays the request to the server 180 at step 295.

If there is a match in the interception key registry, the flow moves to step 225, where it is determined whether or not network connectivity is available. At step 230, a policy check is performed to determine if there is no applicable policy 230A or if a policy 230B must be enforced.

If there is no applicable policy, at step 275 the intermediary 130 relays the request to server 180. At step 280, intermediary 130 stores the server response in I-Store 150. At step 285, intermediary 130 relays the response to the embedded server 190. Intermediary 130 also relays the response to the application 110.

If there is an interception key registry match, the network is available, and a policy must be enforced to require local processing, or if there is an interception key registry match and network connectivity is unavailable, the flow moves to step 235.

At step 235, the intermediary 130 must determine from the interception key whether to serve the request statically or dynamically. If the determination is made that the request should be served statically at step 235A, then intermediary 130 responds to the application 110 with data from I-Store 150.

At step 235B, it is determined that the request is to be processed by the embedded server 190. At step 245, intermediary checks embedded server registry to determine the address of the embedded server 190 associated with the interception key. At step 250, intermediary 130 relays 250 the request to appropriate embedded server 190. At step 255, embedded server 190 processes the request using data from the ES-Store 195 and I-Store 150. At step 260, embedded server 190 updates ES-Store 195 to reflect changed to locally stored data resulting from the processing. At step 265, embedded server 190 responds to the request via the intermediary 130. At step 270, synchronization manager detects network availability and synchronizes the data in the ES-Store 195 and the I-Store 150 with the server 180.

4.2 Spreadsheet-to-PDF Example

In one embodiment, an application may be designed to produce a PDF version of a spreadsheet. All spreadsheet cell data is stored in the I-Store 150. The application 110 is a program executing in a browser that allows the editing of a spreadsheet.

As editing occurs, the version on server 180 is changed. When server 180 is unavailable due to lack of network connectivity, embedded server 190 is used to process requests to edit the spreadsheet. The version of the spreadsheet stored in I-Store 150 is changed. The ES-Store 195 keeps track of the changes pending to be communicated back to the server.

The application may subsequently send a request to produce PDF version of the spreadsheet. While offline, or based on policy, the intermediary determines that the request should be processed locally by matching the request to an interception key in the interception key registry. The interception key is then matched to an embedded server 190 based on the embedded server registry.

Intermediary 130 relays the request to embedded server 190, which then generates a PDF based on the local copy of the data in the I-Store. The PDF is then stored in I-Store 150, and sent to the application 110.

The interception key registry is subsequently changed to indicate that the PDF may be locally served by the intermediary if it is requested once again. This is done by placing the associated URI into a key in the interception key registry, and leaving out the method that is used to request the PDF document. This is because the presence of a URI indicates that the request is to be processed locally by either the intermediary 130 or the embedded server 190. If the method is part of the interception key, then that method is to be processed by the embedded server 190. If the method is omitted from the key, that method is to be processed by the intermediary 130.

4.3 Photo Sharing Example

In an embodiment, an application 110 asks server 180 for a feed, such as an atom feed. The feed location (URI) is known by both the application 110 and the embedded server 190 based on the initial configuration of both. Also based on initial configuration, feed is registered to be intercepted by the intermediary 130 in the interception key registry. In an embodiment, in order for the intermediary to know about the embedded server 190, the embedded server 190 must be running.

The embedded server knows about all of the same starting point interception keys as the application, but the embedded server 190 will tell the intermediary 130 that the embedded server 190 wants to intercept certain methods through the registration process. The intermediary 130 could fetch the data based on the information provided by the embedded server 190, or wait until the application 110 asks for data from that interception key.

Intermediary 130 will subsequently make the request to server 180 for the feed and inform the embedded server 190 that the feed is available. The embedded server 190 then analyzes the data and puts metadata in the ES store that describes the entries in the feed.

For example, an application 110 may want to provide a photo sharing application offline. The embedded server knows the starting point for the galleries of a person for which it has been configured. Each gallery has photos. Each photo may include other data such as comments about the photos or tag information.

Embedded server 190 instructs intermediary 130 to capture data at the root address for the listing of the galleries known to embedded server 190. In the mean time, the application 110 is also aware of the root address for the galleries. Depending on the configuration of the intermediary 130, the intermediary 130 may fetch the data based on the request from the embedded server 190, or wait for the application 110 to request the data. Either way, the intermediary will inform the embedded server 190 when the data arrives.

Once the data arrives, the list of galleries stored in I-Store 150. Intermediary 130 alerts embedded server 190, which, during registration, had provided a callback address in the form of a function address to call when the data is available. Intermediary 130 calls the function to inform embedded server 190 that data is available.

If the application 110 did not ask for the data, the application will not be informed of the data's existence. Otherwise, the application 110 will be alerted to the successful capture of the data. In an embodiment, application is alerted any time that new data arrives. However, the policies determining whether or not an application will be alerted upon the arrival of new data may be configurable.

The embedded server 190 does not need to make a copy of the data. Instead, the embedded server 190 simply needs to know that there is a gallery called gallery1.atom and another called gallery2.atom. Therefore, only the metadata describing the state of the embedded server's knowledge about the data needs to be stored in the ES-Store 195.

An update request is sent to server 180 to update gallery1.atom using the POST method. However, intermediary 130 detects that no network connectivity exists. Intermediary checks the interception key registry to find that the URI leading to gallery1.atom is registered to be processed by the embedded server for the POST method. Intermediary then looks to the embedded server registry to determine the address of the embedded server to send the request to. If the embedded server has not been launched, no address will exist. The Intermediary may be configured to fail in this case, or may be configured to launch the embedded server 190 at this point.

Once the appropriate embedded server 190 receives the request, embedded server looks to the ES-Store 195 to determine the state of gallery1.atom. Embedded server 190 processes the request to update gallery1.atom, and inserts a flag into ES-Store indicating that the update to gallery1.atom is stored in the ES-Store 195. Embedded server 190 will also generate a request for server 180, and store the request as a pending update in ES-Store. Synchronization manager 160 will then perform the update at the request of the intermediary 130 once the intermediary 130 detects network connectivity or otherwise determines that it is time for synchronization to occur. Meanwhile, the response is passed to the application 110, which may be ignorant of the fact that the request was processed locally.

Once the data has been changed in the I-Store 150, intermediary 130 may serve the data locally. For example, a GET request for gallery1.atom may arrive from the application, and intermediary may provide the data from the I-Store 150 without consulting embedded server 190.

4.4 Contact List Example

The ES-Store 195 may be shared with an application. In a phone number application, for example, every phone number may correspond to a URI. Users may wish to search a contact list to find a particular contact. One way to search contact list information is to search by the first letter of the first or last name.

In order to search effectively, an index is required. An example index for a contact record that has URI, name, phone1, and phone2 as columns would store letters and the associated URIs. When the user types "E" he will find which of all URIs have the letter "E" associated with them.

When the user is online and types E, a request is usually sent to the server 180. However, if the application 110 is aware of ES-Store 195, then the application 110 can make a direct local request to the ES-Store 195. When the user is offline, an embedded server can intercept the request and look at the ES-Store 195 to find the matching contacts, mimicking the server behavior.

4.5 General Example

In an embodiment, an interception registry includes entries that consist of a URI and a protocol method that may be intercepted. An interception registry may include a URI and a method pattern, along with a reference to an interception function that is to be used for processing requests. An embedded database contains data used for off-line processing of data requests.

An installation process adds one or more interception keys to the interception registry. Keys for each URI to be served off-line are added. The installation process adds one or more interception keys that identify embedded servers to process off-line requests. The embedded database may be used in processing requests An intermediary 130 may intercept requests. An example request that may be intercepted by the intermediary 130 includes a URI, a protocol method, and one or more arguments. Together, these request elements represent an action that is to be performed on the resource identified by the first URI in conformance to a particular protocol as indicated by the resource and the first method.

The intermediary 130 matches the URI and the protocol method with a URI and method stored in the interception registry. If there is no matching URI and method in the interception registry, the intermediary 130 sends the request to the server 180. From the server 180, the intermediary 130 receives a response, which the intermediary 130 sends to the application, ending the interception session.

Alternatively, the intermediary 130 matches the URI and protocol method with the patterns in the embedded server registry. If no matching server is listed in the server registry, the intermediary 130 sends the request to the server 180. The intermediary 130 receives a response from the server 180. The intermediary 130 then sends the response to the application, ending the interception session.

In another embodiment, the intermediary 130 calls the interception function associated with the matching embedded server 190 with the information from the request. This information includes the URI, the protocol method, and the arguments. This interception function is given access to the embedded database. The result of this function is sent to the first application, ending the interception session.

In another embodiment, the intermediary 130 may instruct the embedded server 190 to review a response received from the server 180. Embedded server 190, upon reviewing the response, may determine that additional data should be stored in order to provide offline support for future requests that may rely on the same data as the reviewed request. To ensure that the additional data is stored, embedded server 109 may add one or more interception keys to the interception key registry that indicate that a particular request should be served locally. Any other configuration change may also be made by the embedded server 190 based on the review of a response from server 180.

5.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
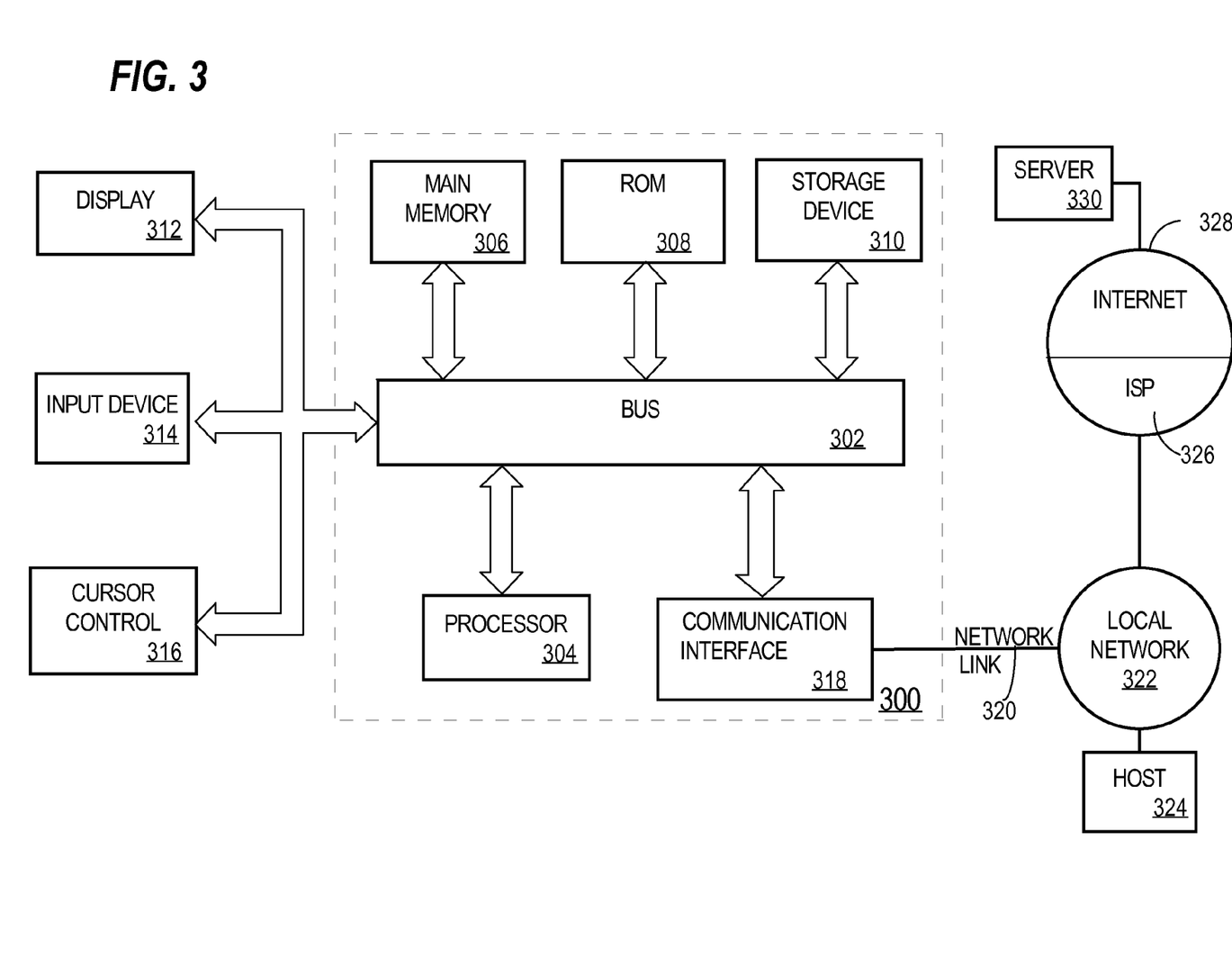
FIG. 3 illustrates a computer system upon which an embodiment may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented process, comprising:
    intercepting, at an intermediary on a first computing device, from an application running on the first computing device, a first request;
    wherein the first request is a request directed to a server, and identifies:
        a particular resource identifier, wherein a resource identifier identifies a resource that is remote to the first computing device; and
        one or more particular methods, wherein the one or more particular methods represent actions that may be performed on a resource;
    determining that the first request and an interception key of a plurality of interception keys match based on the particular resource identifier and the one or more particular methods;
    wherein each interception key of the plurality of interception keys is associated with a respective embedded server on the first computing device;
    in response to determining that the first request and the interception key match, relaying the first request to an embedded server associated with the interception key;
    wherein the process is performed by one or more computing devices.

2. The method of claim 1, further comprising:
    determining an embedded server based on the interception key;

wherein determining the embedded server comprises matching the key to an embedded server address from a plurality of embedded server addresses stored in an embedded server registry.

3. The method of claim 1, wherein at least one of the one or more particular methods of respective methods is identified by a NULL value reference.

4. The method of claim 3, wherein:
the first request is a request to retrieve or store data; and
the resource identifier indicates the data to be stored or retrieved.

5. The method of claim 4, further comprising:
the embedded server storing data in an embedded database;
receiving a second request, wherein the second request is a request to retrieve data from the server;
the embedded server responding to the second request using data stored in the embedded database;
subsequent to storing data in the embedded database, synchronizing the embedded database with the server.

6. The method of claim 5, wherein the step of synchronizing the embedded database with the server comprises determining that synchronization should occur, based, at least in part, on one or more policy criteria.

7. The method of claim 6, wherein the one or more policy criteria includes criteria related to one or more of:
time;
power consumption;
communication privacy;
network usage cost;
network availability;
conflicts caused by server contention; or
user expressed preferences.

8. The method of claim 1, further comprising:
determining that the first request should be sent to the embedded server based at least in part on one or more policy criteria.

9. The method of claim 8, wherein the one or more policy criteria includes criteria related to one or more of:
time;
power consumption;
communication privacy;
network usage cost;
network availability;
conflicts caused by server contention; or
user expressed preferences.

10. The method of claim 1, wherein the first computing device is a mobile computing device.

11. The method of claim 1, wherein the intermediary is a browser plugin.

12. The method of claim 1, further comprising:
storing, at an authorization registry, an authorization key, wherein the authorization key represents an authorization condition associated with the interception key;
receiving, from the embedded server, a response to the first request;
wherein the response to the first request is based, at least in part, on whether or not the authorization condition has been satisfied.

13. The method of claim 12, further comprising:
based on a determination that the authorization condition is no longer satisfied:
removing the authorization key from an authorization registry; and
removing the interception key from an interception key registry.

14. The method of claim 1, further comprising:
the embedded server revising an interception key registry, wherein the step of revising the interception key registry comprises at least one of the following:
changing a key in the interception key registry;
adding a key to the interception key registry; and
removing a key from the interception key registry.

15. A computer-implemented method, comprising:
intercepting, at an intermediary on a first computing device, from an application running on the first computing device, a first request;
wherein the first request is a request directed to a server, and identifies:
a particular resource identifier, wherein a resource identifier identifies a resource that is remote to the first computing device; and
one or more particular methods, wherein the one or more particular methods represent actions that may be performed on a resource;
determining that the first request and an interception key of a plurality of interception keys match based on the particular resource identifier and the one or more particular methods;
wherein each interception key of the plurality of interception keys is associated with a respective embedded server on the first computing device, and is associated with:
a respective resource identifier; and
one or more references to respective methods, wherein the respective methods represent actions that may be performed on a resource;
relaying the first request to the server;
receiving, from the server, a first response to the first request;
relaying the first response to an embedded server associated with the interception key;
the embedded server, based on a determination made from analyzing the first response, causing first data associated with the first response to be stored;
wherein the process is performed by one or more computing devices.

16. The method of claim 15, further comprising:
intercepting, at the intermediary, a second request, wherein the second request is directed to the server and includes the first resource identifier;
based at least in part on the interception key, the intermediary determining that the request can be satisfied with the first data;
the intermediary responding to the second request using first data.

17. The method of claim 15, further comprising:
determining that the first request should be relayed to the embedded server based at least in part on one or more policy criteria.

18. The method of claim 17, wherein the one or more policy criteria includes criteria related to one or more of:
time;
power consumption;
communication privacy;
network usage cost;
network availability;
conflicts caused by server contention; or
user expressed preferences.

19. The method of claim 15, further comprising:
the embedded server revising an interception key registry, wherein the step of revising the interception key registry comprises at least one of the following:

changing a key in the interception key registry;
adding a key to the interception key registry; and
removing a key from the interception key registry.

20. One or more non-transitory computer-readable media storing instructions, which, when executed by one or more processors, cause one or more computing devices to perform operations comprising:
intercepting, at an intermediary on a first computing device, from an application running on the first computing device, a first request;
wherein the first request is a request directed to a server, and identifies:
a particular resource identifier, wherein a resource identifier identifies a resource that is remote to the first computing device; and
one or more particular methods, wherein the one or more particular methods represent actions that may be performed on a resource;
determining that the first request and an interception key of a plurality of interception keys match based on the particular resource identifier and the one or more particular methods;
wherein each interception key of the plurality of interception keys is associated with a respective embedded server on the first computing device;
in response to determining that the first request and the interception key match, relaying the first request to an embedded server associated with the interception key.

21. The non-transitory computer-readable media of claim 20, the operations further comprising:
determining the embedded server based on the interception key;
wherein determining the embedded server comprises matching the interception key to an embedded server address from a plurality of embedded server addresses stored in an embedded server registry.

22. The non-transitory computer-readable media of claim 20, wherein at least one of the one or more particular methods or respective methods is identified by a NULL value reference.

23. The non-transitory computer-readable media of claim 22, wherein:
the first request is a request to retrieve or store data; and
the particular resource identifier indicates the data to be stored or retrieved.

24. The non-transitory computer-readable media of claim 23, the operations further comprising:
the embedded server storing data in an embedded database;
receiving a second request, wherein the second request is a request to retrieve data from the server;
the embedded server responding to the second request using data stored in the embedded database;
subsequent to storing data in the embedded database, synchronizing the embedded database with the server.

25. The non-transitory computer-readable media of claim 24, wherein the step of synchronizing the embedded database with the server comprises determining that synchronization should occur, based, at least in part, on one or more policy criteria.

26. The non-transitory computer-readable media of claim 25, wherein the one or more policy criteria includes criteria related to one or more of:
time;
power consumption;
communication privacy;
network usage cost;
network availability;
conflicts caused by server contention; or user expressed preferences.

27. The non-transitory computer-readable media of claim 20, the operations further comprising:
determining that the first request should be sent to the embedded server based at least in part on one or more policy criteria.

28. The non-transitory computer-readable media of claim 27, wherein the one or more policy criteria includes criteria related to one or more of:
time;
power consumption;
communication privacy;
network usage cost;
network availability;
conflicts caused by server contention; or user expressed preferences.

29. The non-transitory computer-readable media of claim 20, wherein the first computing device is a mobile computing device.

30. The non-transitory computer-readable media of claim 20, wherein the intermediary is a browser plugin.

31. The non-transitory computer-readable media of claim 20, the operations further comprising:
storing, at an authorization registry, an authorization key, wherein the authorization key represents an authorization condition associated with the interception key;
receiving, from the embedded server, a response to the first request;
wherein the response to the first request is based, at least in part, on whether or not the authorization condition has been satisfied.

32. The non-transitory computer-readable media of claim 31, the operations further comprising:
based on a determination that the authorization condition is no longer satisfied:
removing the authorization key from the authorization registry; and
removing the interception key from an interception key registry.

33. The non-transitory computer-readable media of claim 20, the operations further comprising:
the embedded server revising an interception key registry, wherein the step of revising the interception key registry comprises at least one of the following:
changing a key in the interception key registry;
adding a key to the interception key registry; and
removing a key from the interception key registry.

34. One or more non-transitory computer-readable media storing instructions, which, when executed by one or more processors, cause one or more computing devices to perform operations comprising:
intercepting, at an intermediary on a first computing device, from an application running on the first computing device, a first request;
wherein the first request is a request directed to a server, and identifies:
a particular resource identifier, wherein a resource identifier identifies a resource that is remote to the first computing device; and
one or more particular methods, wherein the one or more particular methods represent actions that may be performed on a resource;
determining that the first request and an interception key of a plurality of interception keys match based on the particular resource identifier and the one or more particular methods;

wherein each interception key of the plurality of interception keys is associated with a respective embedded server on the first computing device, and is associated with:
  a respective resource identifier; and
  one or more references to respective methods, wherein the respective methods represent actions that may be performed on a resource;
relaying the first request to the server;
receiving, from the server, a first response to the first request;
relaying the first response to an embedded server associated with the interception key;
the embedded server, based on a determination made from analyzing the first response, causing first data associated with the first response to be stored.

35. The non-transitory computer-readable media of claim 34, the operations further comprising:
  intercepting, at the intermediary, a second request, wherein the second request is directed to the server and includes the particular resource identifier;
  based at least in part on the interception key, the intermediary determining that the second request can be satisfied with the first data;
  the intermediary responding to the second request using first data.

36. The non-transitory computer-readable media of claim 34, the operations further comprising:
  determining that the first request should be relayed to the embedded server based at least in part on one or more policy criteria.

37. The non-transitory computer-readable media of claim 36, wherein the one or more policy criteria includes criteria related to one or more of:
  time;
  power consumption;
  communication privacy;
  network usage cost;
  network availability;
  conflicts caused by server contention; or user expressed preferences.

38. The non-transitory computer-readable media of claim 34, the operations further comprising:
  the embedded server revising an interception key registry, wherein the step of revising the interception key registry comprises at least one of the following:
  changing a key in the interception key registry;
  adding a key to the interception key registry; and
  removing a key from the interception key registry.

* * * * *